(12) United States Patent
Moriyama (10) Patent No.: US 6,926,340 B2
(45) Date of Patent: Aug. 9, 2005

(54) VEHICLE SIDE-DOOR STRUCTURE (75) Inventor: Yukihiro Moriyama, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/674,799

(22) Filed: Oct. 1, 2003

(65) Prior Publication Data
US 2004/0119318 A1 Jun. 24, 2004

(30) Foreign Application Priority Data
Oct. 1, 2002 (JP) ........................................ 2002-288219

(51) Int. Cl.[7] .............................................. B60J 5/00
(52) U.S. Cl. .................... 296/146.6; 296/146.9
(58) Field of Search ........................ 296/146.6, 146.9, 296/203.01, 146.8, 187.12, 187.11, 146.11; 292/5, 336.3, 216

(56) References Cited

U.S. PATENT DOCUMENTS

| | | | | |
|---|---|---|---|---|
| 2,827,321 A | * | 3/1958 | Leslie et al. .................... 292/5 |
| 2,997,336 A | * | 8/1961 | Grant et al. ............. 296/146.9 |
| 4,930,836 A | * | 6/1990 | Grinn .................... 296/146.11 |
| 5,364,157 A | | 11/1994 | Siedlecki |
| 5,749,611 A | * | 5/1998 | Watson et al. ............. 292/336.3 |
| 5,782,523 A | * | 7/1998 | Heldt et al. ............... 296/146.6 |
| 6,059,352 A | * | 5/2000 | Heldt et al. ............... 296/146.6 |
| 6,332,641 B1 | * | 12/2001 | Okana ...................... 296/146.6 |
| 6,619,729 B2 | * | 9/2003 | Kimura et al. ......... 296/203.03 |
| 6,659,537 B2 | * | 12/2003 | Moriyama et al. ....... 296/146.6 |
| 6,694,676 B2 | * | 2/2004 | Sakamoto et al. .......... 292/216 |
| 6,779,831 B2 | * | 8/2004 | Moriyama ............... 296/146.9 |
| 6,808,225 B2 | * | 10/2004 | Moriyama ............... 296/146.6 |
| 2003/0006625 A1 | * | 1/2003 | Moriyama et al. ....... 296/146.6 |
| 2004/0080179 A1 | * | 4/2004 | Okazaki et al. .......... 296/146.6 |

FOREIGN PATENT DOCUMENTS

| | | |
|---|---|---|
| DE | 101-19-131 | 11/2002 |
| EP | 1-068-970 | 6/2000 |
| EP | 1-275-539 | 1/2003 |
| JP | 57041209 | * 3/1982 |
| JP | 2000-280744 | 10/2000 |
| JP | 2001-138864 | 5/2001 |

* cited by examiner

Primary Examiner—Kiran B. Patel
(74) Attorney, Agent, or Firm—Nixon Peabody LLP; Donald R. Studebaker (57) ABSTRACT A vehicle side-door structure, in which a front door and a rear door cover a continuous opening with no partition in a side part of a vehicle so that the opening is opened and closed, the front door is pivotally attached on a hinge at its front part to a vehicle body so that the front door is opened and closed, and the rear door is pivotally attached on a hinge at its rear part to the vehicle body so that the rear door is opened and closed, includes: a front-door rear reinforcement, the front-door rear reinforcement being disposed at a rear end part of the front door and extending in the vertical direction along the rear end part.

9 Claims, 13 Drawing Sheets

VEHICLE SIDE-DOOR STRUCTURE

BACKGROUND OF THE INVENTION

1. Field of the Invention

This invention relates to a vehicle side-door structure which has what is called a freestyle structure (or a double-leafed hinged door structure). Specifically, a front door and a rear door cover a door opening with no center pillar so that the opening can be opened and closed, the front door is pivotally attached on a hinge at its front part to a vehicle body so that it can be opened and closed, and the rear door is pivotally attached on a hinge at its rear part to the vehicle body so that it can be opened and closed.

2. Description of the Related Art

The following is a conventional example of such a vehicle side-door structure. According to the example, a continuous door opening with no partition is formed in a side part of a vehicle body, and a front door and a rear door cover the door opening so that it can be opened and closed. Then, the front door is pivotally attached on a front-door hinge at its front part to the vehicle body, the rear door is pivotally attached on a rear-door hinge at its rear part to the vehicle body. Next, a side-door made up of the front door and the rear door is configured so as to have what is called a double-leafed hinged door structure. In addition, the rear-end part of the front door overlaps with the outside of the front-end part of the rear door, and a reinforcement member which extends in the up-and-down directions (or simply "vertical direction") is provided on the inside of the front-end part of the rear door (for example, refer to Japanese Patent Laid-Open No. 2001-138864 specification)

The above described double-leafed hinged door with no center pillar has a structure in which the reinforcement member is disposed at the front part of the rear door, and the rear-end part of the front door overlaps with the outside of the front-end part of the rear door. However, there has been a disadvantage in that such a structure cannot provide adequate rigidity. Particularly, when the vehicle is bumped at its side part, the side door makes its way into the vehicle cabin. In such an accident, the side door has not been rigid enough to reduce the depth to which it makes inroads.

In consideration of the aforementioned problem, it is an object of the present invention to provide a vehicle side-door structure which is capable of, in the side door having a double-leafed hinged door structure, enhancing the rigidity of the side door, thus reducing the depth to which the side door makes its way into the vehicle cabin at the time of a vehicle-side bump, and thereby, keeping vehicle occupants safer in such an accident. In order to attain the object, in the vehicle side-door structure according to the present invention, a front-door rear reinforcement is provided in a rear end part of the front door, which extends in the up-and-down directions along the rear end part.

SUMMARY OF INVENTION

A vehicle side-door structure according to the present invention in which a front door and a rear door cover a continuous opening with no partition in a side part of a vehicle so that the opening is opened and closed, the front door is pivotally attached on a hinge at a front part thereof to a vehicle body so that the front door is opened and closed, and the rear door is pivotally attached on a hinge at a rear part thereof to the vehicle body so that the rear door is opened and closed, said side-door structure comprising a front-door rear reinforcement, disposed at a rear end part of the front door and extending substantially in the vertical along the rear end part.

The front-door rear reinforcement may also be configured by a steel thick-plate member.

According to the above described configuration, the front-door rear reinforcement is provided along the up-and-down direction (vertical direction) in the rear end part of the front door. Thereby, in the side door having a double-leafed hinged-door structure, its rigidity can be enhanced against a load given when the vehicle is bumped, at its side part, thus the depth to which the door makes its way into the vehicle cabin can be reduced at such a time, and thereby, vehicle occupants can be kept safer in such an accidents.

These and other objects, features and advantages of the present invention will become more apparent upon reading of the following detailed description along with the accompanied drawings.

DETAILED DESCRIPTION OF INVENTION

Hereinafter, the vehicle side-door structure according to an embodiment of the present invention will be described in detail with reference to the accompanied drawings.

Figure 1:
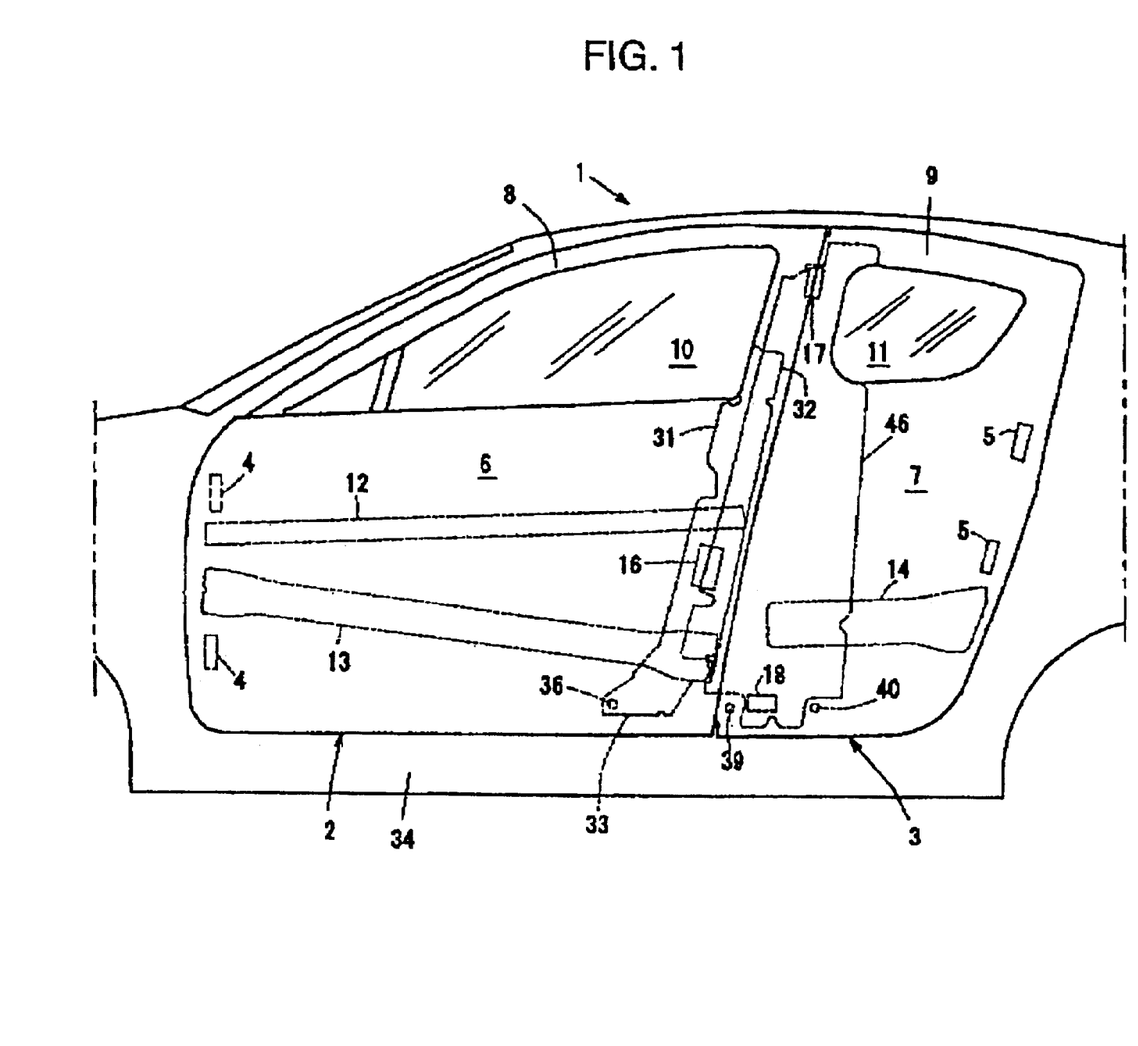
FIG. 1 is a side view showing a vehicle side-door structure according to the present invention.

Those drawings show a side door of a vehicle which has a freestyle structure (or a double-leafed hinged door structure). In FIG. 1, a side door configured by a front door 2 and a rear door 3 is provided on the vehicle-body side of a vehicle 1. In the front-end part of the front door 2 and the rear-end part of the rear door 3, a front-door hinge 4 and a rear-door hinge 5 are provided as a hinge portion, respectively.

The front door 2 is pivotally attached on the front-door hinges 4, 4 to a hinge pillar used as a vehicle-body rigid member so that it can be opened and closed. The rear door 3 is pivotally attached on the rear-door hinges 5, 5 to a rear body, so that it can be opened and closed. Both the front door 2 and the rear door 3 cover a continuous door opening portion 15 (see FIG. 11) with no partition in a side part of the vehicle so that the opening is opened and closed.

The front door 2 and the rear door 3, which configures the side door, includes door panels 6, 7, door sash portions 8, 9, and a window glass 10 and a flip window 11, respectively. Inside the door panels 6, 7 impact bars 12, 13, 14 are provided which extends in the front-and-rear directions (or simply "longitudinal direction") of the vehicle.

In the door having a double-leafed hinged door structure according to this embodiment, the front door 2 is opened ahead of the rear door 3. In other words, the rear door 3 cannot be opened unless the front door 2 is opened.

Figure 11:
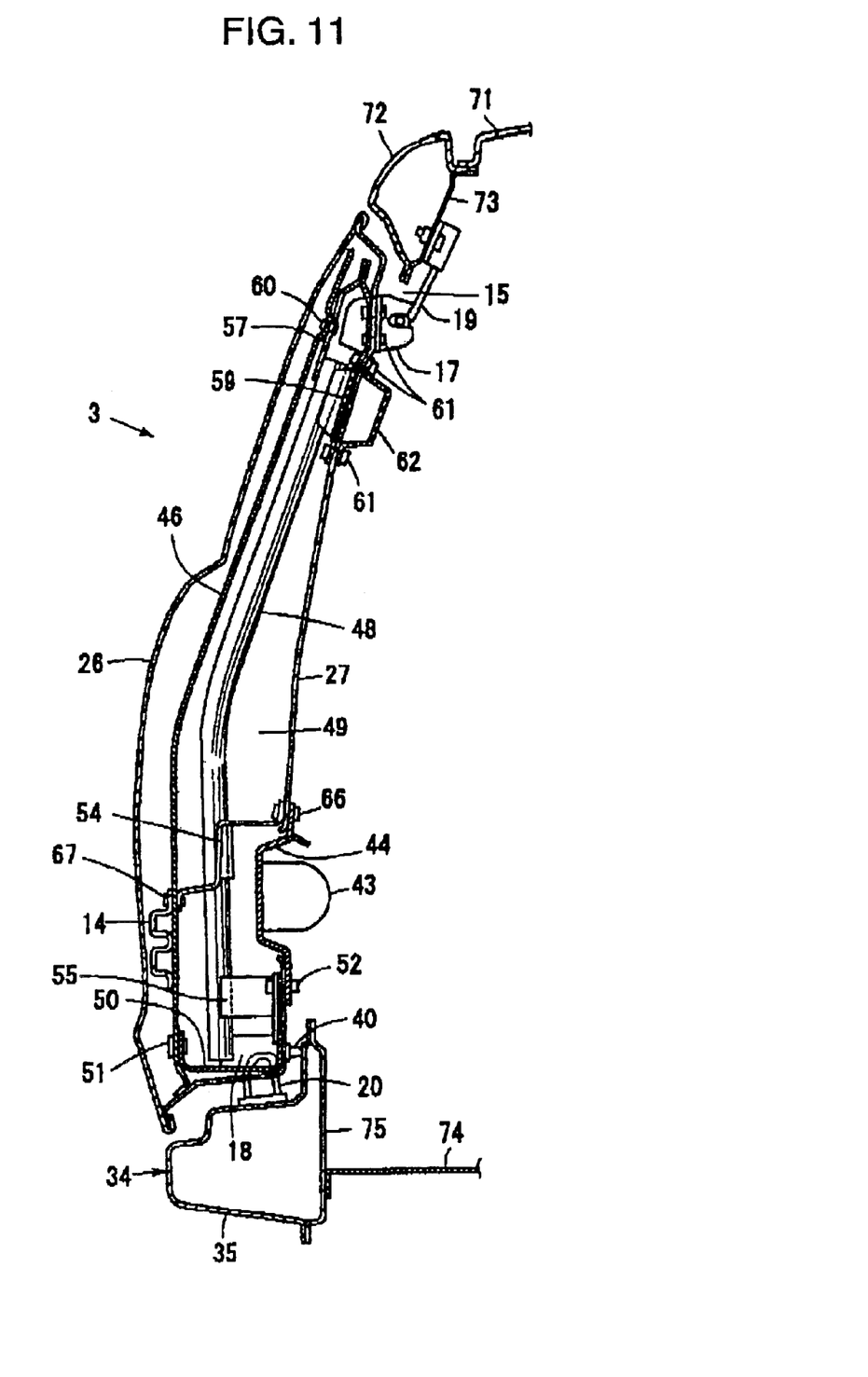
FIG. 11 is a sectional view showing th rear door, seen along a G—G line in FIG. 10.

Each of the doors 2, 3 opens and closes the door opening portion 15 (see FIG. 11). As shown in FIG. 1, a door latch 16 which can be hooked to and unhooked from the rear door 3 is provided at a rear-end part of the front door 2. The door latch 16 is locked by a striker provided at a front-end part of the rear door 3. At upper and lower parts of the front-end part of the rear door 3, door latches 17, 18 are provided which can be hooked to and unhooked from a vehicle body. These door latches 17, 18 are locked by strikers 19, 20 on the body side (mentioned later with reference to FIG. 11, respectively. Herein the strikers 19, 20 are disposed at an upper-side part and at a lower-side part of the door opening portion 15 (see FIG. 11), respectively.

Figure 2:
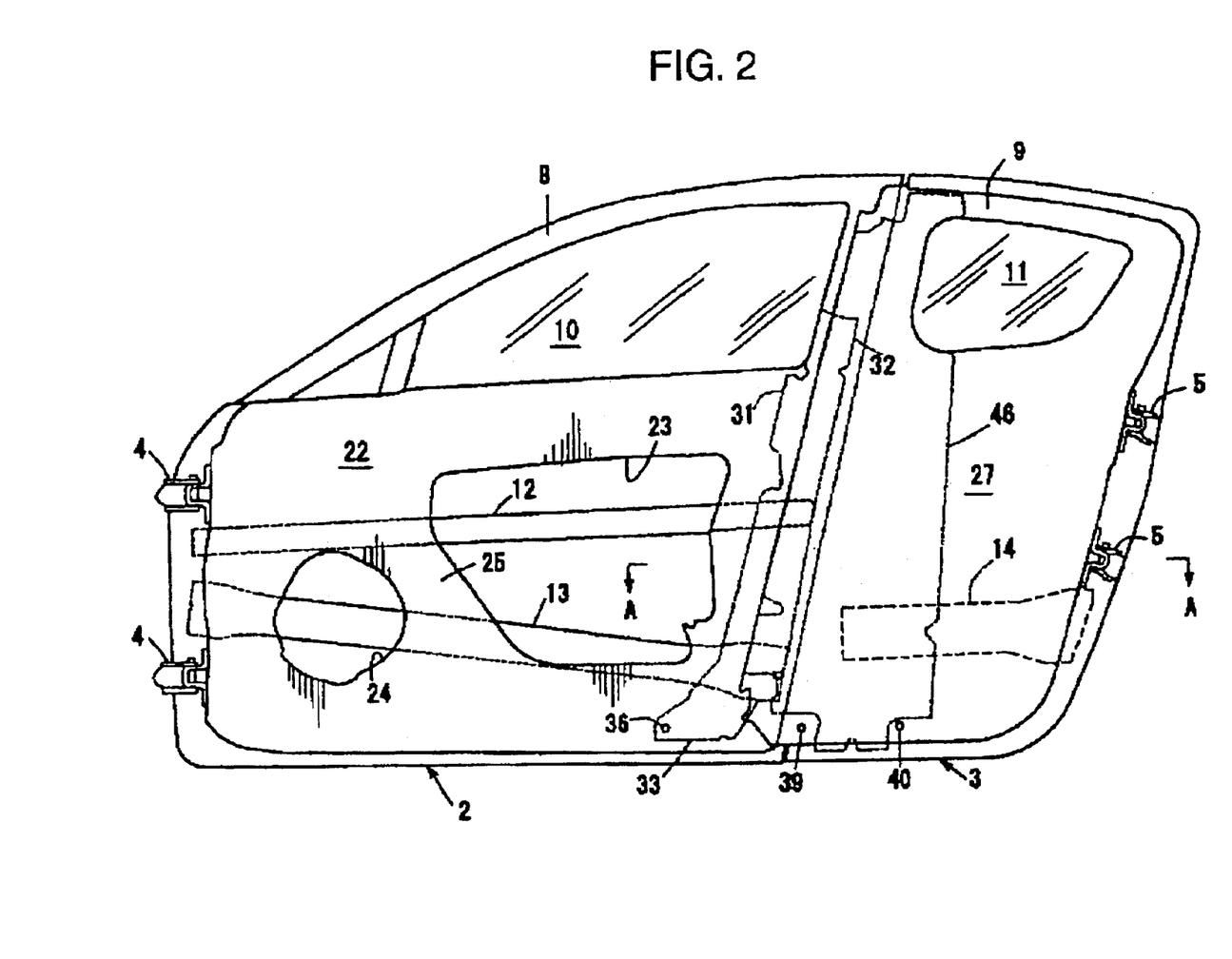
FIG. 2 is a side view showing the side-door structure, seen from the inside of a vehicle cabin.
Figure 3:
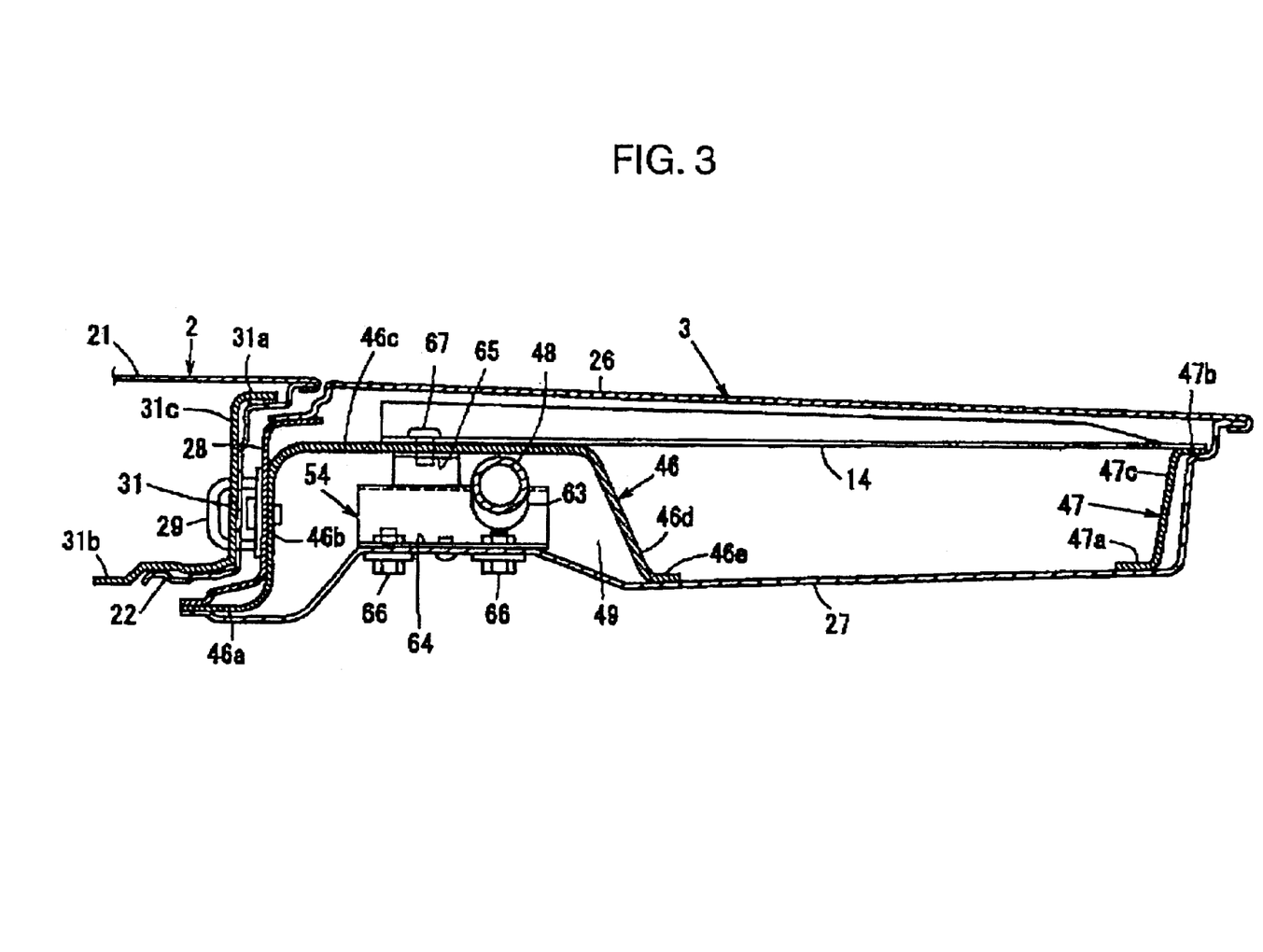
FIG. 3 is a sectional view showing the side-door structure, seen along an A—A line in FIG. 2.

FIG. 2 is a side view showing the side door on the right-hand side, seen from the inside of a vehicle cabin. FIG. 3 is a partial sectional view showing the side-door structure, seen along an A—A line in FIG. 2. When the front door 2 and the rear door 3 are close, as shown in FIG. 3, the rear part of the front door 2 overlaps over a predetermined area with the front-part outside of the rear door 3.

The front door 2 includes a door outer panel 21 and a door inner panel 22. As shown in FIG. 2, two opening portions 23, 24 and a partition portion 25 are formed in the door inner panel 22. The partition portion 25 is located between the opening portions 23, 24 and extends in an oblique direction or in an inclining direction from the upper front to the lower-rear.

The rear door 3 includes door outer panels 26, 28 divided into two members and a door inner panel 27. Each panel 26, 27, 28 is made of light metal or light alloy, such as aluminum or aluminum alloy. A striker 29 is attached to a predetermined part of the door outer panel 28 which configures the front-end part of the rear door 3. The striker 29 corresponds to the door latch 16 of the front door 2.

Figure 4:
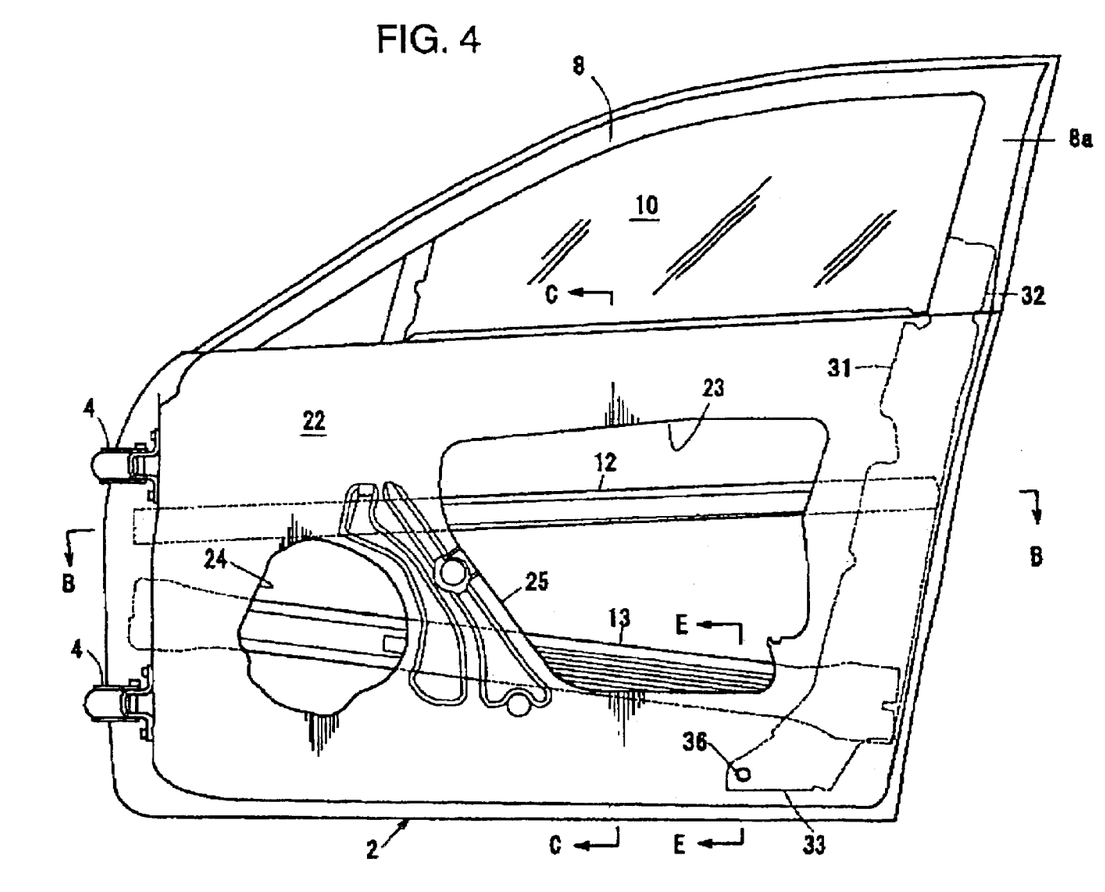
FIG. 4 is a side view showing a front door.
Figure 5:
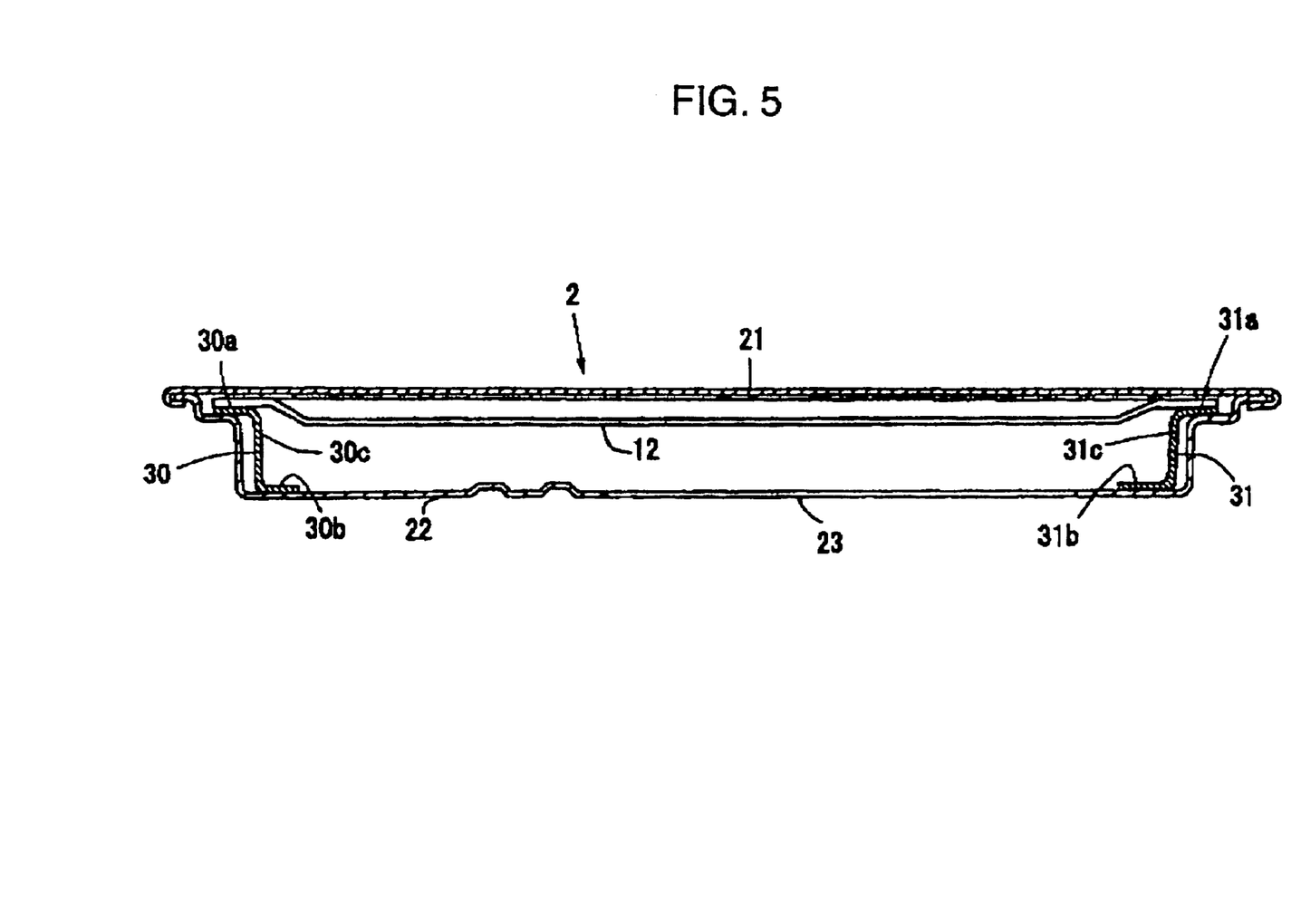
FIG. 5 is a sectional view showing the front door, seen along a B—B line in FIG. 4.

FIG. 4 is a side view showing the front door 2 on the right-hand side, seen from the inside of the vehicle cabin. FIG. 5 is a sectional view showing the front door 2, seen along a B—B line in FIG. 4. A hinge reinforcement 30 is disposed at a front longitudinal-side part (frontal end) of the front door 2 configured by joining the door outer panel 21 and the door inner panel 22. The hinge reinforcement 30 extends in the vertical direction along the front end part. Herein, the hinge reinforcement 30 is a rigid member which allows the door to become more rigid. Hereinafter the term "vertical direction" is used to express a direction along an up & down directions. However, the vertical direction in the following descriptions needs not be an exact vertical direction (i.e., a perpendicular or 90 degrees with respect to a horizontal plane) but it is meant to cover a substantially vertical direction as being understood by a person skilled in the art.

The hinge reinforcement 30 is formed by a thick-plate member and has a substantially Z-shaped cross section.

Thus, the hinge reinforcement 30 includes: a front strip 30a which extends in the longitudinal direction of the vehicle on the vehicle outside; a rear strip 30b which extends in the longitudinal direction of the vehicle on the vehicle inside: and a connecting strip 30c connecting both strips 30a, 30b which extends in the vehicle-width directions.

A front-door rear reinforcement 31 is disposed at a rear longitudinal-side part (or simply "rear end part") of the front door 2. The front-door rear reinforcement 31 extends in the vertical direction along the rear end part. Herein, the front-door rear reinforcement 31 is a rigid member which makes the door more rigid.

The front-door rear reinforcement 31, as shown in FIGS. 3, 5, 6 and 7, is formed by a thick-plate member and has a substantially z-shaped cross section. Thus, the front-door rear reinforcement 31 includes: a rear strip 31a which extends in the longitudinal direction of the vehicle on the vehicle outside, a front strip 31b which extends in the longitudinal direction of the vehicle on the vehicle inside; and a connecting strip 31c connecting both strips 31a, 31b which extends in the vehicle-width directions.

As shown in FIG. 4, the front-door rear reinforcement 31 includes an extending-out portion 32 at its upper-end part. The extending-out portion 32 extends continuously into a rear end part 8a of a door sash portion 8. It makes the sash structure more rigid and also prevents seal members from being sucked out of the vehicle by negative pressure while it is running at high speed.

As shown in FIG. 4, the front-door rear reinforcement 31 includes an extending portion 33 at its lower-end part. The extending portion 33 extends forward along the front-and-rear side at the lower part of the front door 2. It makes the front-door rear reinforcement 31 itself more rigid.

Figure 6:
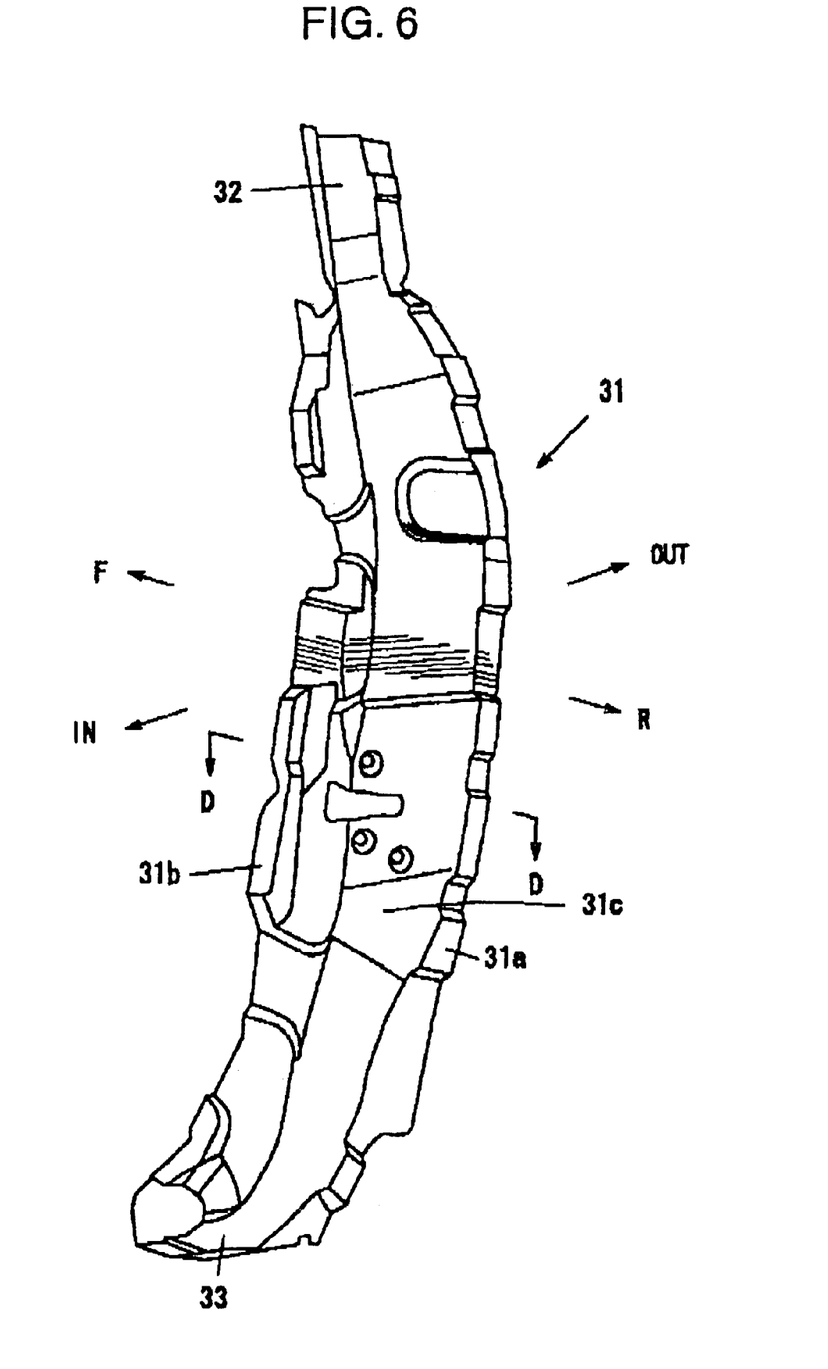
FIG. 6 is a perspective view showing a front-door rear reinforcement.
Figure 7:
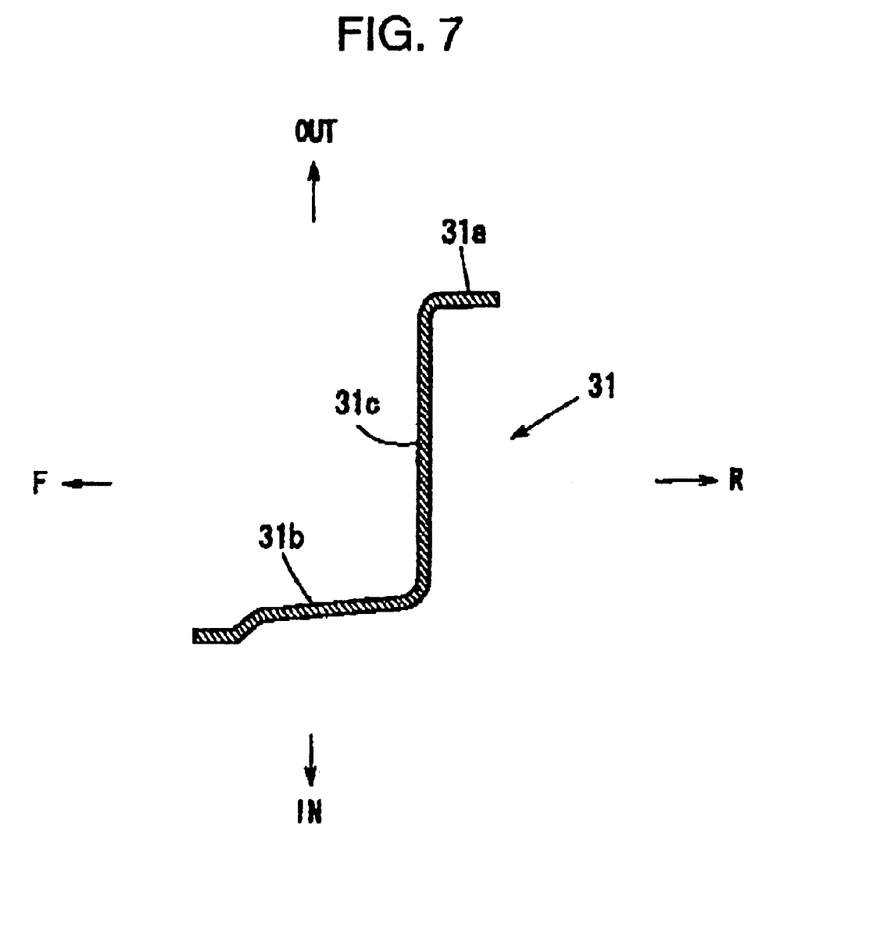
FIG. 7 is a sectional view showing the front-door rear reinforcement, seen along a D—D line in FIG. 6.

Throughout the whole front-door rear reinforcement 31 including the extending-out portion 32 and the extending portion 33, as shown in FIG. 6, a plurality of uneven portions are formed which make the front-door rear reinforcement 31 stronger.

Figure 8:
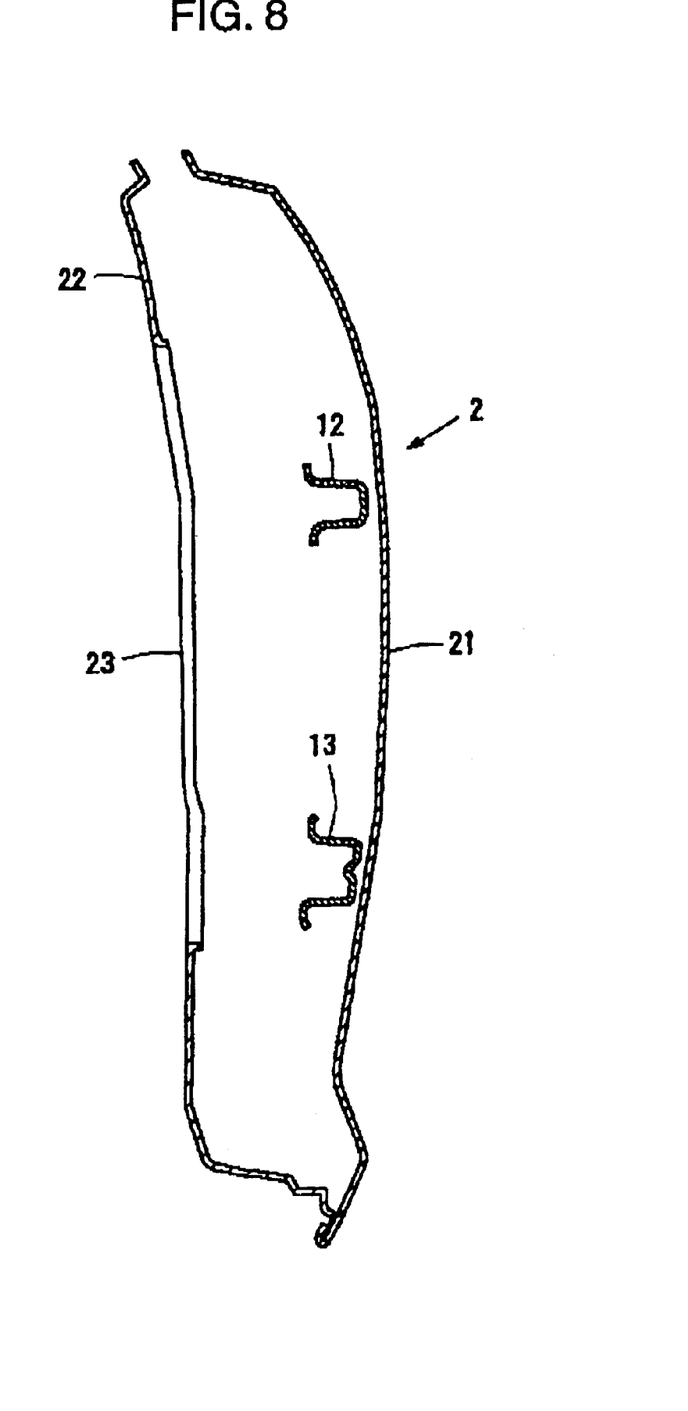
FIG. 8 is a sectional view showing the front door, seen along a C—C line in FIG. 4.

As shown in FIGS. 4, 5 and 8, the impact bar 12 mentioned above is joined and fixed to the front strip 30a of the hinge reinforcement 30 and the rear strip 31a of the front-door rear reinforcement 31, between each strip or between each rigid member, such that it extends in the longitudinal direction of the vehicle. In other words, the front-end part and the rear-end part of the impact bar 12 overlap the hinge reinforcement 30 and the front-door rear reinforcement 31, respectively.

The lower impact bar 13 placed apart from the impact bar 12 in the vertical direction, as shown in FIG. 4, is also joined and fixed to the front strip 30a of the hinge reinforcement 30 and the rear strip 31a of the front-door rear reinforcement 31, between each strip or between each rigid member, such that it extends in the longitudinal direction of the vehicle. In other words, the front-end part and the rear-end part of the impact bar 13 overlap the hinge reinforcement 30 and the front-door rear reinforcement 31, respectively.

As shown in FIG. 8, the plurality of impact bars 12, 13 placed apart in the longitudinal direction have a sideways convex-shaped cross section with protruding on the vehicle outside. This cross-sectional structure makes the impact bars 12, 13 themselves more rigid.

Figure 9:
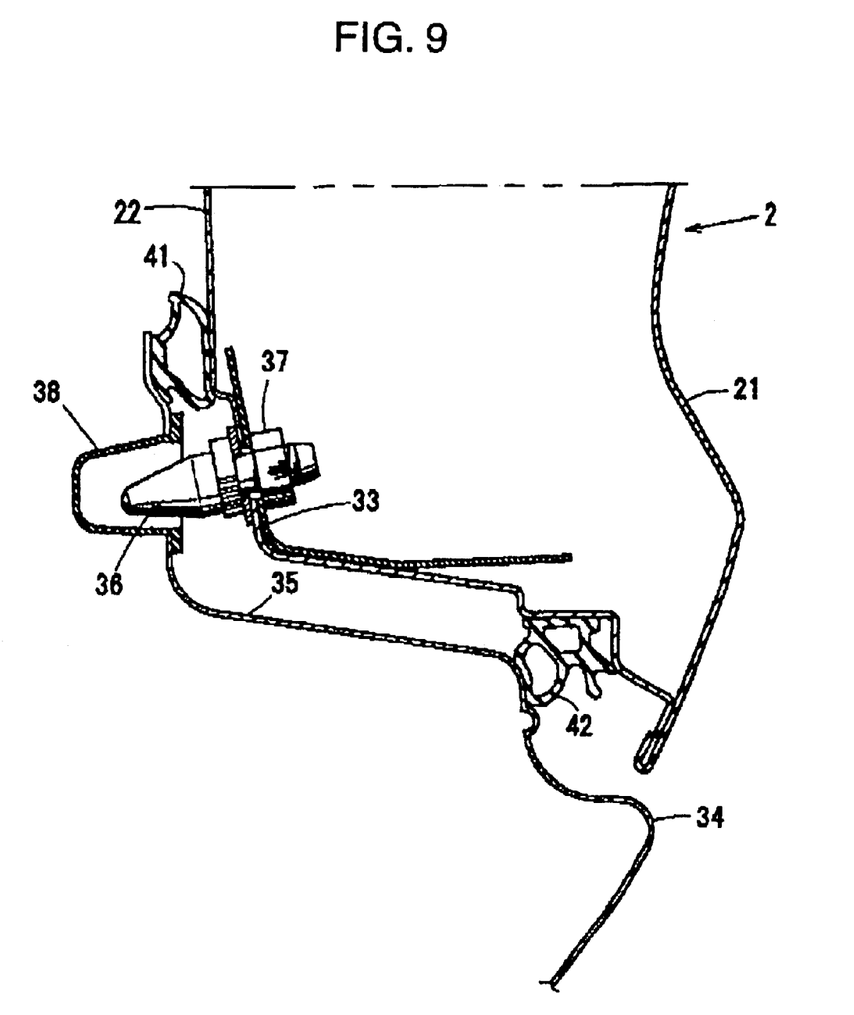
FIG. 9 is an enlarged sectional view showing a main part of the front door, seen along an E—E line in FIG. 4.

FIG. 9 is an enlarged sectional view showing a main part of the front door, seen along an E—E line in FIG. 4. A catcher pin 36 is provided at a rear lower-end part of the front door 2. The catcher pin 36 protrudes convexly from the front door 2 toward a side-shell outer 35 of a side shell 34 on the vehicle-body side.

A nut 37 is welded and fixed beforehand to the extending portion 33 of the lower end part of the aforementioned front-door rear reinforcement 31. In the extending portion 33 and the door inner panel 22 which face the nut 37, a hole portion is formed which a screw portion of the catcher pin 36 is, inserted through. Thus, the catcher pin 36 is tightened and fixed to the nut 37 from the vehicle-cabin inside of the door inner panel 22.

In a position corresponding to the catcher pin 36, a catcher-pin receiving portion, 38 is provided in the side-shell outer 35. The catcher-pin receiving portion, 38 is made of synthetic resin and has a concave shape. The catcher pin 36 is inserted into the catcher-pin receiving portion 38 when the front door 2 is closed.

FIG. 9 is the sectional view when the front door 2 is fully closed. The internal diameter of the catcher-pin receiving portion 38 is set to be relatively long compared with the external diameter of the catcher pin 36. Herein, the catcher pin 36 is a door-inroads controlling member for controlling inroads of the front door 2 when the vehicle is bumped at its side part.

In addition, the catcher pin is provided not only in the front door 2, but also in the lower part of the rear door 3, as shown in FIG. 1 and FIG. 2. Catcher pins 36, 39, 40 are each located at substantially equal intervals in the longitudinal direction.

In FIG. 9, a seal member 41 which seals a gap between the vehicle body and the front door 2 is disposed on the upper-end exterior surface of the side-shell outer 35. On the other hand, a seal member 42 which seals a gap between the front door 2 and the side shell 34 as the vehicle body is provided in the lower part of the door inner panel 22 of the front door 2.

Figure 10:
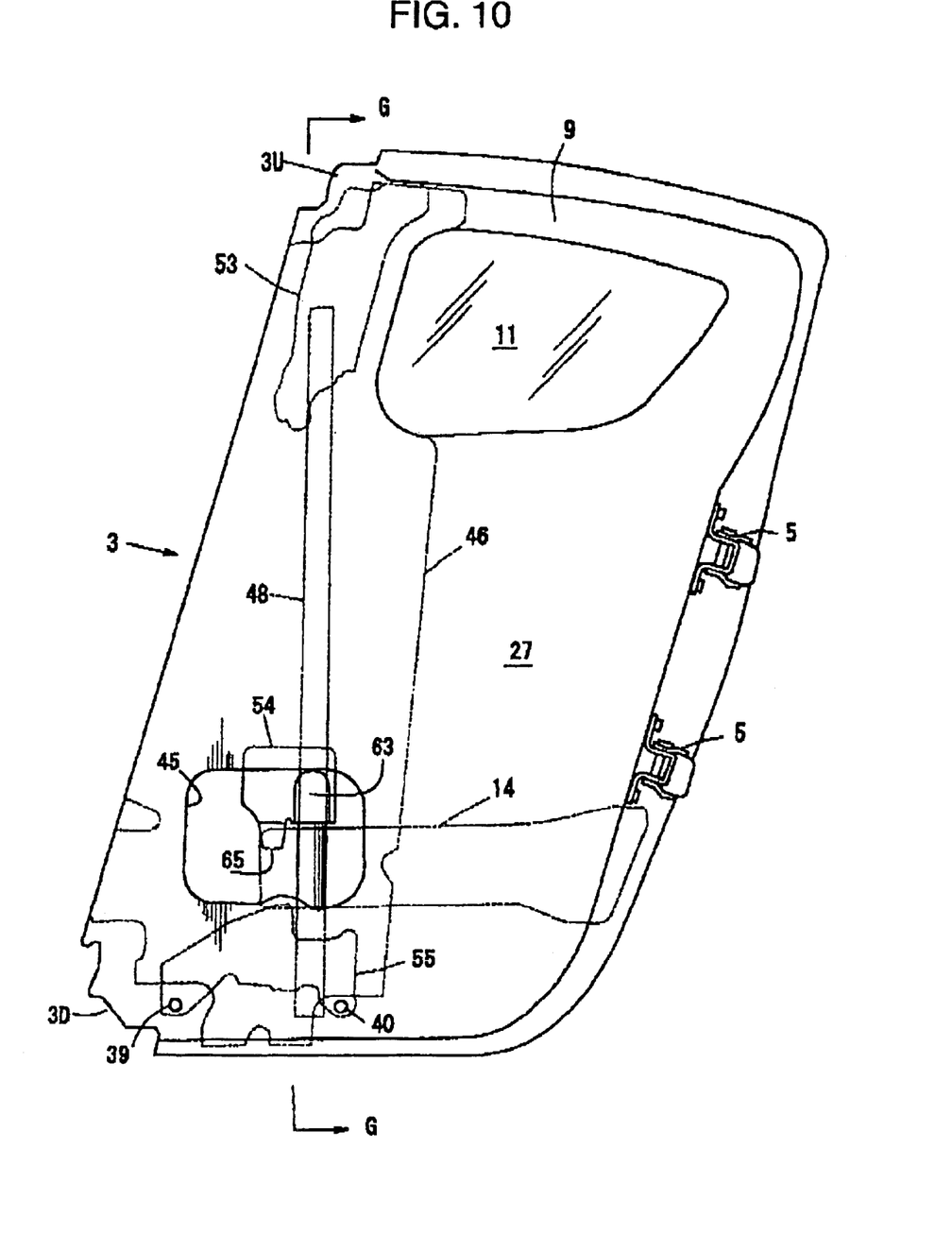
FIG. 10 is a side view showing a rear door.

FIG. 10 is a side view showing the right-hand rear door 3, seen from the inside of the vehicle cabin. FIG. 11 is a sectional view showing the rear door 3 seen along a G—G line in FIG. 10. As shown in FIG. 10 and FIG. 11, in the lower part of the rear door 3, an opening portion 45 is formed at a predetermined part of the inner panel 27. A bracket 44 of a seatbelt retractor 43 is attached to the opening portion 45.

As shown in FIGS. 3, 10 and 11, a vertical reinforcement 46 is provided in the front end part of the rear door 3. The vertical reinforcement 46 extends along the vertical direction over a substantially entire height of the front end part including the door sash portion 9 of the rear door 3.

The vertical reinforcement 46 is formed by a thick-plate member of light metal or light alloy such as aluminum or aluminum alloy. As shown in FIG. 3, it has a substantially hat-shaped cross section. Thus, the vertical reinforcement 46 includes: a front strip 46a which extends in the longitudinal direction of the vehicle in the vehicle-inside front part; a front-plane strip 46b which extends in a vehicle-width direction from the rear end of the front strip 46a; a side-plane strip 46c which extends rearward in the longitudinal direction of the vehicle from the outer end of the front-plane strip 46b; a rear-plane strip 46d which extends rearward in the longitudinal direction of the vehicle and inward in the vehicle-width directions from the rear end of the side-plane strip 46c; and a rear strip 46e which extends rearward in the longitudinal direction of the vehicle from the inner end of the rear-plane strip 46d.

The front strip 46a is sandwiched and fixed between the door inner panels 27, 28. The striker 29 is attached to the part in which the front-plane strip 46b overlaps with the door inner panel 28. The rear strip 46e is joined to the middle inner-surface of the door inner panel 27 in the longitudinal direction.

Furthermore, as shown in FIG. 3, a hinge reinforcement 47 is provided in the rear end part of the rear door 3. The hinge reinforcement 47 is a rigid member and extends along the vertical direction of the rear door 3.

The hinge reinforcement 47 is formed by a thick-plate member of light metal or light alloy such as aluminum or aluminum alloy and has a substantially Z-shaped cross-section. Thus, the hinge reinforcement 47 includes: a front strip 47a which extends in the longitudinal direction of the vehicle on the vehicle inside; a rear-strip 47b which extends in the longitudinal direction of the vehicle on the vehicle outside: and a connecting strip 47c connecting both strips 47a, 47b which extends in the vehicle-width directions.

As shown in FIGS. 3, 10 and 11, the horizontal impact bar 14 mentioned previously is joined and fixed to the side-plane strip 46c of the vertical reinforcement 46 and the rear strip 47b of the hinge reinforcement 47, between each strip or between each rigid member, such that it extends in the longitudinal direction of the vehicle. In other words, the front-end part and the rear-end part of the horizontal impact bar 14 overlap the vertical reinforcement 46 and the hinge reinforcement 47, respectively. This overlap structure allows the rear door 3 to become more rigid against a vehicle-side bump.

As its cross sectional shape is shown in FIG. 11, the horizontal impact bar 14 has an uneven shape which makes the horizontal impact bar 14 itself more rigid.

In the rear door 3, as shown in FIG. 10, its front end part leans to the back. Between a front-upper edge part 3U (or a front-upper corner part) of the front end part and a part which is away from front-lower edge part 3D (or a front-lower corner part) thereof, a longitudinal impact bar 48 is provided which extends perpendicularly in the vertical direction.

This longitudinal impact bar 48 is formed by a pipe member made of high-strength steel. As can be seen from the side in FIG. 10 the vertical reinforcement 46 is placed to overlap with the longitudinal impact bar 48 in the longitudinal direction of the vehicle. More specifically, as shown in FIG. 3, a closed cross section 49 is formed between the vertical reinforcement 46 and the door inner panel 27. The longitudinal impact bar 48 is placed inside this closed cross section 49.

Furthermore, the horizontal impact bar 14, as shown in FIG. 3 and FIG. 10, is placed to overlap at its front part with the longitudinal impact bar 48 in the longitudinal direction of the vehicle.

Besides, as the state in which the front door 2 and the rear door 3 are closed is shown in FIG. 3 when both doors 2, 3 are closed the front-door rear reinforcement 31 is placed to overlap with the vertical reinforcement 46 disposed in the front end part of the rear door 3.

As shown in FIG. 11, a door latch reinforcement 50 is provided inside the lower part of the rear door 3. Herein, the door latch reinforcement 50 has a concave longitudinal section.

The door latch reinforcement 50 includes a vehicle-outside stand-up strip and a vehicle-inside stand-up strip. The vehicle-outside stand-up strip is fixed, using a rivet 51, to the lower part of the vertical reinforcement, 46. On the other hand, the vehicle-inside stand-up strip is fixed, using attachment members 52 such as a bolt, a nut and a rivet, to the door inner panel 27, together with a bracket 44 and a lower-end bracket 55 (mentioned below) of the longitudinal impact bar 48.

Figure 12:
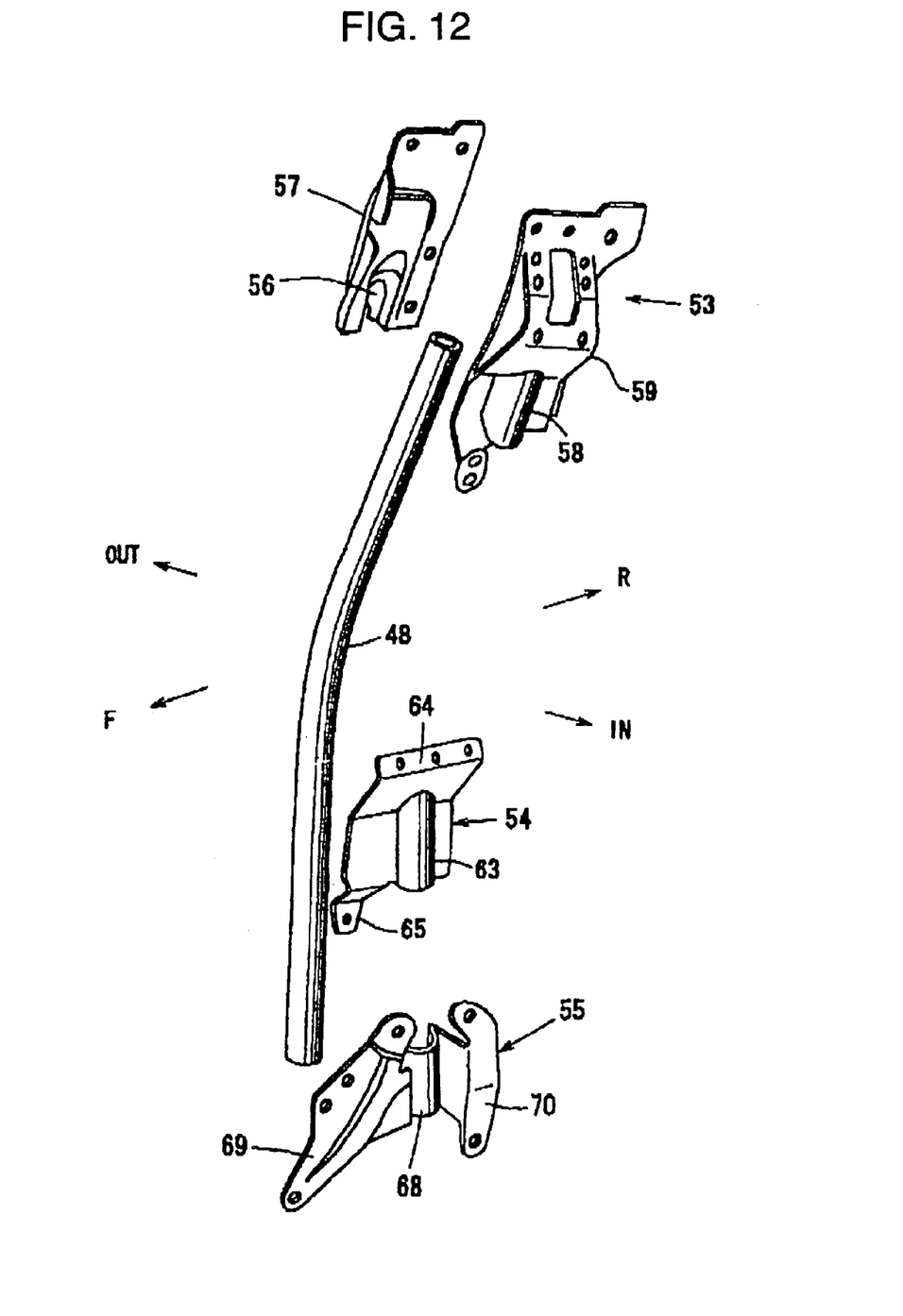
FIG. 12 is a perspective exploded view showing a longitudinal impact bar and attachment brackets for the impact bar.

The longitudinal impact bar 48 is fixed, as shown in FIG. 11 and FIG. 12, using an upper-end bracket 53, a middle bracket 54 and the lower-end bracket 55, to the vertical reinforcement 46 and the door inner panel 27.

Herein, the upper-end bracket 53 is configured by two members of an outer bracket 57 and an inner bracket 59. The outer bracket 57 includes a holding portion 56 which has a substantially semicircular section. The inner bracket 59 includes a holding portion 58 which has a substantially semicircular section. Both brackets 57, 59 are joined to hold the upper-end part of the longitudinal impact bar 48. The outer bracket 57 is fixed, using a rivet 60, to the upper part of the vertical reinforcement 46. On the other hand, the inner bracket 59 is fixed, using attachment members 61 . . . such as a bolt and a nut, to the door inner panel 27, together with the door latch 17 and an anchor bracket 62 used for a shoulder-belt anchor.

The middle bracket 54 includes: a holding portion 63 which has a substantially semicircular section; an upper-part attachment strip 64; and a lower-part attachment strip 65. As also shown in FIG. 3, the holding portion 63 holds a middle part of the longitudinal impact bar 48. The upper-part, attachment strip 64 is fixed, using attachment members 66 such as a bolt and a nut, to the door inner panel 27, together with the bracket 44. The lower-part attachment strip 65 is fixed, using a rivet 67, to the vertical reinforcement 46 together with the horizontal impact bar 14.

The lower-end bracket 55 includes: a holding portion 68 which has a substantially semicircular section; and front and rear attachment strips 69, 70. The holding portion 68 holds a lower-end part of the longitudinal impact bar 48, the front and rear attachment strips 69, 70 is fixed, using attachment members 52 such as a bolt, a nut and a rivet, to the door inner panel 27, together with the door latch reinforcement 50 and the bracket 44.

Herein, the upper-end bracket 53, the middle bracket 54 and the lower-end bracket 55 are welded and fixed at their predetermined part to a circumferential part of the longitudinal impact bar 48.

In FIG. 11, a roof rail outer 72 and a roof rail inner 73 are joined to a side part of a roof panel 71 at an upper part of the vehicle-body side. The striker 19 mentioned previously is attached to the roof rail inner 73.

The side shell 34 is joined to a side part of a floor panel 74 at a lower part of the vehicle-body side. Herein, the side shell 34 is configured by a side-shell inner 75 and the side-shell outer 35. The striker 19 mentioned above is attached to a predetermined part of the side-shell outer 35.

The aforementioned description has been provided of the structure mainly of the front door 2 and the rear door 3 on the right-hand side. However, the front door 2 and the rear door 3 on the left-hand side are configured such that they are symmetrical with those of on the right-hand side. In the drawings, reference character F designates the front of the vehicle; R, the rear of the vehicle; IN, the inside of the vehicle; OUT, the outside of the vehicle.

In the vehicle side-door structure according to the embodiment shown in FIG. 1 to FIG. 12, the front door 2 and the rear door 3 cover the continuous opening (refer to the door opening portion 15 with no center pillar) with no partition in the side part of the vehicle so that the opening portion 15 is opened and closed. The front door 2 is pivotally attached on the hinges 4 at its front part to the vehicle body so that the front door 2 is opened and closed. Then, the rear door 3 is pivotally attached on the hinges 5 at its rear part to the vehicle body so that the rear door 3 is opened and closed. The vehicle side-door structure includes the front-door rear reinforcement 31 which is disposed at rear end part of the front door 2 and extends in the vertical direction along the rear end part.

According to this configuration, the front-door rear reinforcement 31 is provided along the vertical direction in the rear-part longitudinal-side part of the front door 2. Thereby, in the side door having a double-leafed hinged door structure, its rigidity can be enhanced against a load given when the vehicle is bumped at its side part, thus the depth to which the door makes its way into the vehicle cabin can be reduced at such a time and thereby, vehicle occupants can be kept safer in such an accident.

The front-door rear reinforcement 31 includes the extending-out portion 32 in its upper-end, part. The extending-out portion 32 extends continuously into the door sash portion 8.

According to this configuration, the extending-out portion 32 of the front-door rear reinforcement 31 allows the door sash portion 8 to become more rigid. This can prevent seal members from being sucked out of the vehicle by negative pressure while it is running at high speed.

Furthermore, the front-door rear reinforcement 31 includes the extending portion 33 in its lower-end part. The extending portion 33 extends along the front-and-rear side of the front door 2.

According to this configuration, the extending portion 33 allows the front-door rear reinforcement 31 itself and the lower part of the front door 2 to become more rigid.

Furthermore, the catcher pin 36 which protrudes convexly on the vehicle-body side is provided at a lower part of the front-door rear reinforcement 31, and the catcher pin 36 is inserted into the concave catcher-pin receiving portion 38 provided in a position corresponding to the vehicle-body side when the front door 2 is closed.

According to this configuration, the catcher pin 36 allows of control of the front door 2's inroads at the time of a vehicle-side bump.

Furthermore, the catcher pin 36 is disposed in the extending portion 33 of the front-door rear reinforcement 31.

According to this configuration, the catcher pin 36 can be put in a proper position, allowing of more effective control of the front door 2's inroads at the time of a vehicle-side bump.

Furthermore, the impact bars 12, 13 are provided which extend in the longitudinal direction of the vehicle, and a rear-end part of each impact bar 12, 13 overlaps with the front-door rear reinforcement 31.

According to this configuration, the impact bars 12, 13 are supported in a position where they become more rigid themselves. In addition, a stronger structure can be secured by reinforcing the front-door rear reinforcement 31 and each impact bar 12, 13 with each other.

Furthermore, as the impact bars 12, 13, a plurality of impact bars are provided which are placed apart in the vertical direction.

According to this configuration the plurality of impact bars 12, 13 can offer greater rigidity and also bear, over a wider range in the vertical direction a load given at the time of a vehicle-side bump. This can keep vehicle occupants safer in such an accident.

Furthermore, the front-door rear reinforcement 31 is disposed to overlap with the front end part (particularly, refer to the vertical reinforcement 46) of the rear door 3 when the front door 2 and the rear door 3 are closed.

According to this configuration, the overlap structure allows the overlapping part to become more rigid, reducing the depth to which the doors 2, 3 make their way into the vehicle cabin at the time of a vehicle-side bump.

Furthermore, the vertical reinforcement 46 is provided along the vertical direction in the front end part of the rear door 3.

According to this configuration, the front part of the rear door 3 becomes more rigid, and the overlapping part of the rear door 3 and the front door 2 also becomes more rigid. In addition, the rear door 3 can also bear a side-bump load, making the side door more rigid against a side bump.

Furthermore, the locking mechanism (refer to the door latches 17, 18) is provided in both upper and lower parts of the rear door 3, and the locking mechanism can be hooked to and unhooked from the vehicle body; and th locking mechanism (refer to the striker 29) is provided in the front part of the rear door 3 and the locking mechanism can be hooked to and unhooked from a rear part of the front-door 2.

According to this configuration, each locking mechanism locks the rear door 3 in the vehicle body and the front door 2, respectively. This allows the side door to become more rigid, further reducing the depth to which the doors 2, 3 make their way into the vehicle cabin at the time of a vehicle-side bump.

Figure 13:
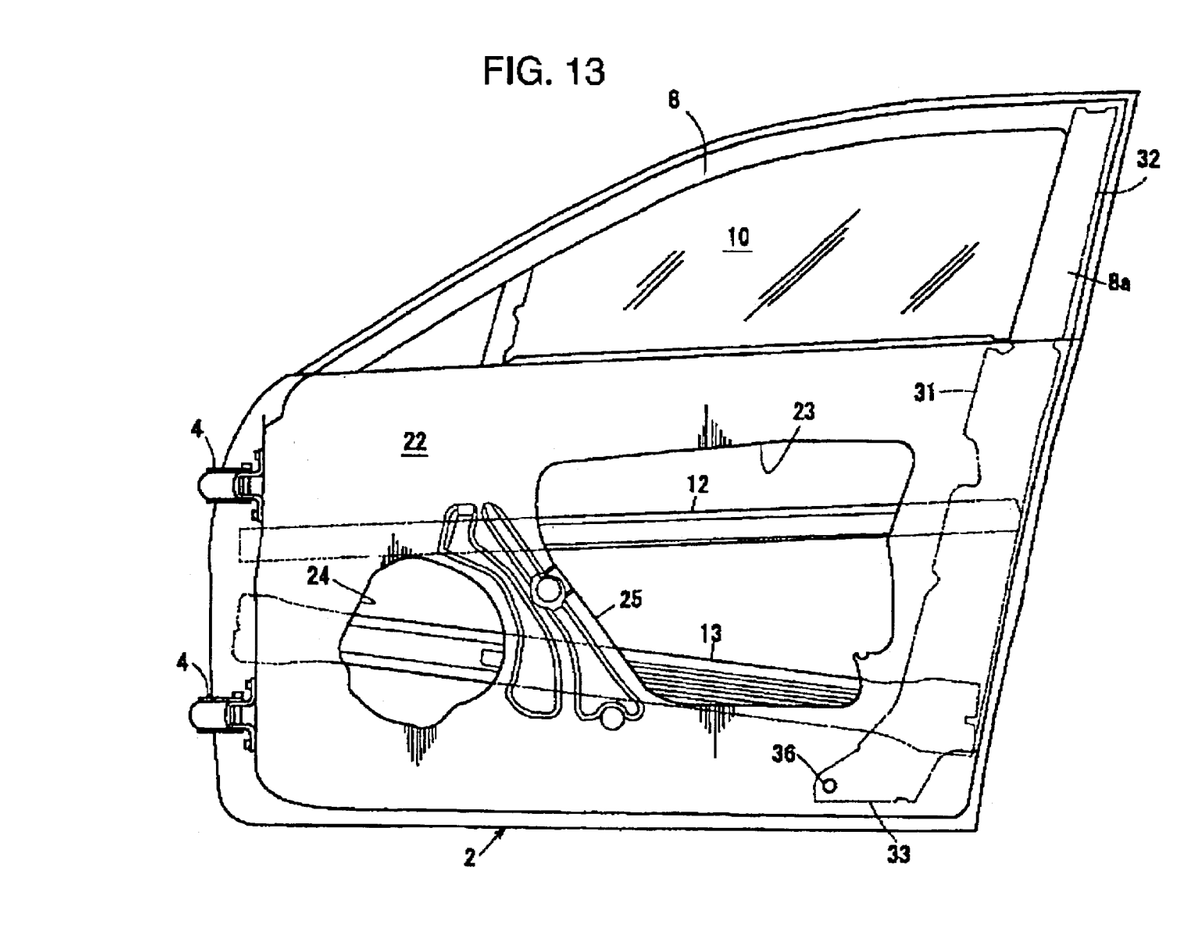
FIG. 13 is a side view showing a vehicle side-door structure according to another embodiment of the present invention.

FIG. 13 shows a vehicle side-door structure according to another embodiment of the present invention. According to the embodiment of FIG. 4, the extending-out portion 32 is formed by extending the upper-end part of the front-door rear reinforcement 31 up to a substantially middle part in the vertical direction of the rear end part 8a of the door sash portion 8. According to the embodiment shown in FIG. 13, however, the extending-out portion 32 is formed by extending the upper-end part of the front-door rear reinforcement 31 up to near the upper end of the rear end part 8a of the door sash portion 8. This allows the sash structure more rigid.

In the vehicle side-door structure according to this embodiment shown in FIG. 13, other constitution, operation and advantages are the same as those according to the embodiment mentioned previously. Therefore, in FIG. 13, the same reference numerals and characters are used as those in the previous figure, and its detailed description is omitted.

With respect to the correspondence of the constitution according to the present invention to the aforementioned embodiments, the continuous opening with no partitions in the vehicle-side part according to the present invention corresponds to the door opening portion 15 with no center pillar according to the embodiments. In the same way, the sash portion corresponds to the door sash portion 8: and the locking mechanism; the door latches 17, 18 and the striker 29. However, the present invention is not limited only to the constitution according to the aforementioned embodiments.

In the vehicle side-door structure according to the present invention, the front-door rear reinforcement is provided in the rear end part of the front door, which extends in the vertical direction along the rear end part. Therefore, the side door having a double-leafed hinged door structure takes advantage of the fact that the rigidity of the side door can be enhanced, thus the depth can be reduced to which the side door makes its way into the vehicle cabin at the time of a vehicle-side bump, and thereby, vehicle occupants can be kept safer in such an accident.

In summary, a vehicle side-door structure according to the present invention, in which a front door and a rear door cover a continuous opening with no partition in a side part of a vehicle so that the opening is opened and closed, the front door is pivotally attached on a hinge at a front part thereof to a vehicle body so that the front door is opened and closed, and the rear door is pivotally attached on a hinge at a rear part thereof to the vehicle body so that the rear door is opened and closed, said side-door structure comprising a front-door rear reinforcement, disposed at a rear end part of the front door and extending substantially in the vertical along the rear end part.

The front-door rear reinforcement may also be configured by a steel thick-plate member.

According to the above described configuration, the front-door rear reinforcement is provided along the up-and-down direction (vertical direction) in the rear end part of the front door. Thereby, in the side door having a double-leafed hinged door structure, its rigidity can be enhanced against a load given when the vehicle is bumped at its side part thus the depth to which the door makes its way into the vehicle cabin can be reduced at such a time, and thereby, vehicle occupants can be kept safer in such an accident.

According to an implementation of the present invention, said front-door rear reinforcement includes an extending-out portion in an upper-end part thereof, said extending-out portion extending continuously into a sash portion.

According to this configuration, the extending-out portion of the front-door rear reinforcement allows the sash portion to become more rigid. This can prevent seal members from being sucked out of the vehicle by negative pressure while it is running at high speed.

According to another implementation of the present invention, said front-door rear reinforcement includes an extending portion in a lower-end part thereof, said extending portion extending along a front-and-rear side of the front door.

According to this configuration, the extending portion allows the front-door rear reinforcement itself and the lower part of the front door to become more rigid.

According to still another implementation of the present invention a catcher pin which protrudes convexly on a vehicle-body side is provided at a lower part of said front-door rear reinforcement, and said catcher pin is inserted into a concave catcher-pin receiving portion provided in a position corresponding to the vehicle-body side when the front door is closed.

According to this configuration, the catcher pin allows of control of the front door's inroads at the time of a vehicle-side bump.

According to still another implementation of the present invention said catcher pin is disposed in said extending portion of the front-door rear reinforcement.

According to this configuration, the catcher pin can be put in a proper position, allowing of more effective control of the front door's inroads at the time of a vehicle-side bump.

According to still another implementation of the present invention an impact bar is provided which extends in the longitudinal direction of the vehicle, and a rear-end part of said impact bar overlaps with said front-door rear reinforcement.

According to this configuration the impact bar is supported in a position where it becomes more rigid itself. In addition, a stronger structure can be secured by reinforcing the front-door rear reinforcement and the impact bar with each other.

According to still another implementation of the present invention, a plurality of said impact bars are provided which are placed apart in the vertical direction.

According to this configuration the plurality of impact bars can offer greater rigidity and also bear, over a wider range in the vertical direction, a load given at the time of a vehicle-side bump. This can keep vehicle occupants safer in such an accident.

According to still another implementation of the present invention, said front-door rear reinforcement is disposed to overlap with a front end part of the rear door when the front door and the rear door are closed.

According to this configuration, the overlap structure allows the overlapping part to become more rigid, reducing the depth to which the front and rear doors make their way into the vehicle cabin at the time of a vehicle-side bump.

According to still another implementation of the present invention, a vertical reinforcement is provided along the vertical direction in the front end part of the rear door.

The vertical reinforcement may also be configured by a metallic thick-plate member.

According to the above described configuration, the front part of the rear door becomes more rigid, and the overlapping part of the rear door and the front door also becomes more rigid. In addition, the rear door can also bear a side-bump load, making the side door more rigid against a side bump.

According to still another implementation of the present invention a first locking mechanism is provided in both upper and lower parts of the rear door, and said first locking mechanism is hooked to and unhooked from the vehicle body; and a second locking mechanism is provided in a front part of the rear door and said second locking mechanism is hooked to and unhooked from a front-door rear part.

According to this configuration, each locking mechanism locks the rear door 3 in the vehicle body and the front door 2, respectively. This allows the side door to become more rigid, further reducing the depth to which the front and rear doors make their way into the vehicle cabin at the time of a vehicle-side bump.

This application is based on Japanese patent application No. 2002-288219, filed in Japan Patent Office on Oct. 1, 2002, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A vehicle side-door structure comprising:
   a front door, pivotally attached on a hinge at a front part thereof to a vehicle body so that the front door is opened and closed;
   a rear door, which is moveable between its closed position and its opened position, so that the rear door is opened and closed, and said front and rear doors together cover a continuous opening with no partition in a side part of a vehicle so that the opening is opened and closed; and
   a front-door rear reinforcement, disposed at a rear end part of the front door and extending substantially in a vertical direction along the rear end part of the front door
   wherein a catcher pin protruding convexly on a vehicle-body side is provided at a lower part of said front-door rear reinforcement; and said catcher pin is inserted into a concave catcher-pin receiving portion provided in a position corresponding to the vehicle-body side when the front door is closed.

2. The vehicle side-door structure according to claim 1, wherein said front-door rear reinforcement includes an extending-out portion at an upper-end part thereof, said extending-out portion extending continuously into a sash portion.

3. The vehicle side-door structure according to claim 1, wherein said front-door rear reinforcement includes an extending portion at a lower-end part thereof, said extending portion extending along a front-&-rear side of the front door.

4. The vehicle side-door structure according to claim 1, wherein said catcher pin is disposed in said extending portion of the front-door rear reinforcement.

5. The vehicle side-door structure according to claim 1, wherein an impact bar is provided which extends in the longitudinal direction of the vehicle, and a rear-end part of said impact bar overlaps with said front-door rear reinforcement.

6. The vehicle side-door structure according to claim 5, wherein a plurality of said impact bars are provided which are placed apart in the vertical directions.

7. The vehicle side-door structure according to claim 1, wherein said front-door rear reinforcement is disposed to overlap with a frontal vertical-side part of the rear door when the front door and the rear door are closed.

8. The vehicle side-door structure according to claim 5, wherein a vertical reinforcement is provided extending along the vertical direction in the frontal vertical-side part of the rear door.

9. The vehicle side-door structure according to claim 1, wherein:
   a first locking mechanism is provided in both upper and lower parts of the rear door, and said first locking mechanism is hooked to and unhooked from the vehicle body; and
   a second locking mechanism is provided in a front part of the rear door, and said second locking mechanism is hooked to and unhooked from a front-door rear part.

* * * * *